United States Patent
Yoon et al.

(10) Patent No.: US 7,663,718 B2
(45) Date of Patent: Feb. 16, 2010

(54) VERY THIN ACHROMATIC QUARTER WAVE FILM LAMINATE FOR TRANSFLECTIVE LCD AND METHOD FOR PRODUCING THE SAME

(75) Inventors: Hyuk Yoon, Gyunggi-do (KR); Je-Hyuk Yoo, Daejeon (KR); Moon-Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 120 days.

(21) Appl. No.: 11/920,354

(22) PCT Filed: Feb. 26, 2007

(86) PCT No.: PCT/KR2007/000971

§ 371 (c)(1),
(2), (4) Date: Nov. 14, 2007

(87) PCT Pub. No.: WO2007/097596

PCT Pub. Date: Aug. 30, 2007

(65) Prior Publication Data

US 2009/0103030 A1    Apr. 23, 2009

(30) Foreign Application Priority Data

Feb. 27, 2006  (KR)  .................. 10-2006-0018746

(51) Int. Cl.
*G02F 1/1347* (2006.01)
*G02F 1/13363* (2006.01)
*C09K 19/00* (2006.01)
*C08F 2/46* (2006.01)

(52) U.S. Cl. .................. 349/122; 349/75; 349/123; 428/1.2; 427/492

(58) Field of Classification Search .................. None
See application file for complete search history.

(56) References Cited

U.S. PATENT DOCUMENTS

| | | | |
|---|---|---|---|
| 5,688,436 A | | 11/1997 | Ohnishi et al. |
| 6,103,323 A | | 8/2000 | Motomura et al. |
| 6,400,433 B1 | * | 6/2002 | Arakawa et al. ............ 349/117 |
| 6,760,157 B1 | | 7/2004 | Allen et al. |
| 2002/0187283 A1 | * | 12/2002 | Gu et al. ...................... 428/1.2 |
| 2004/0032677 A1 | * | 2/2004 | Su Yu et al. ................. 359/883 |
| 2007/0166482 A1 | | 7/2007 | Kim et al. |

FOREIGN PATENT DOCUMENTS

| | | |
|---|---|---|
| KR | 100220237 B1 | 6/1999 |
| KR | 10-2006-0012119 | 2/2006 |
| WO | WO 2004/041925 A1 | 5/2004 |

* cited by examiner

*Primary Examiner*—Omar Rojas
(74) *Attorney, Agent, or Firm*—McKenna Long & Aldridge LLP

(57) ABSTRACT

Disclosed herein is an very thin achromatic quarter wave film laminate for transflective LCD included in an LCD polarizer. More specifically, the very thin achromatic quarter wave film laminate for transflective LCD has a considerably reduced thickness, as compared to conventional quarter wave films in which anisotropic polymeric films are laminated.

16 Claims, 7 Drawing Sheets

[Fig. 1]
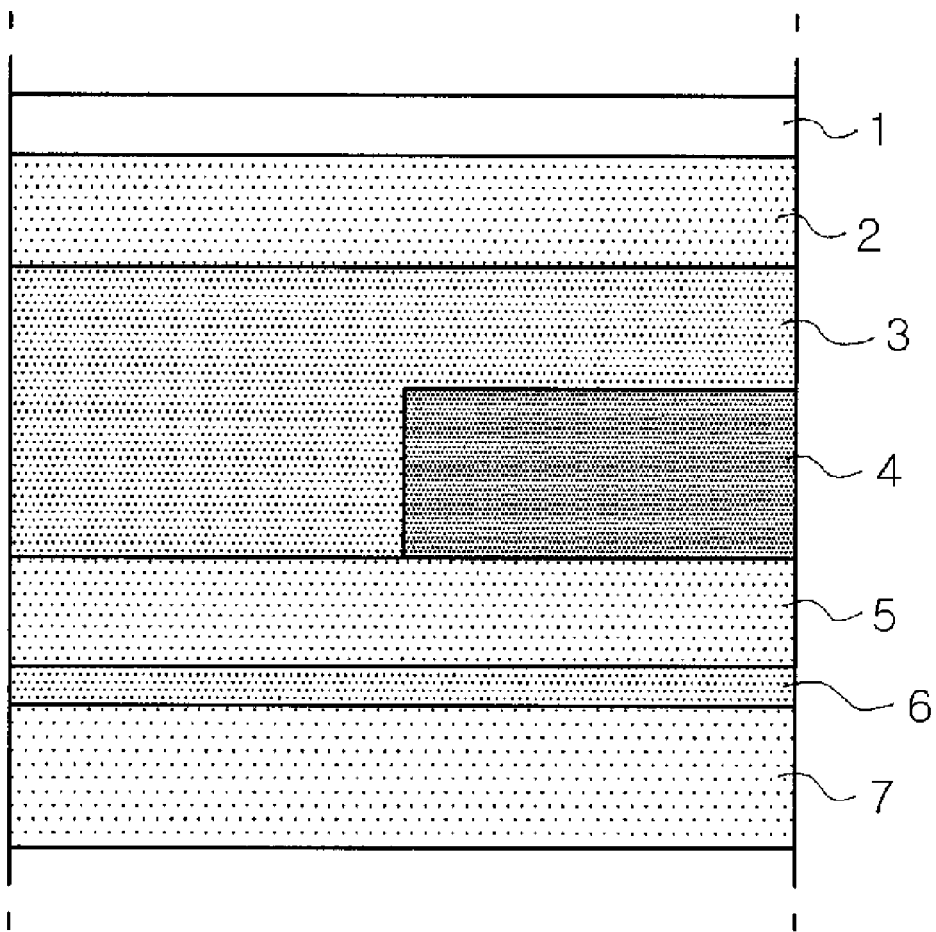

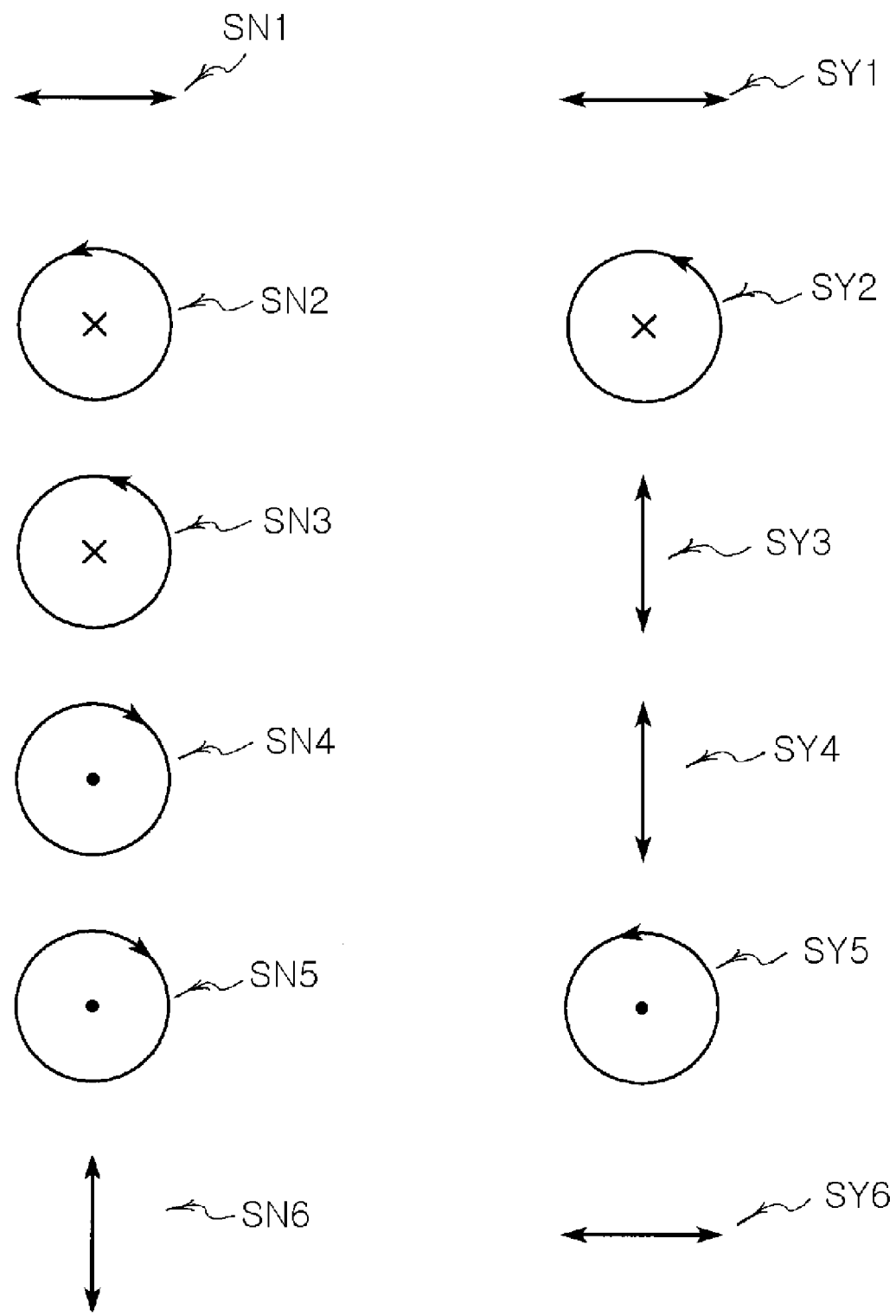
[Fig. 2]

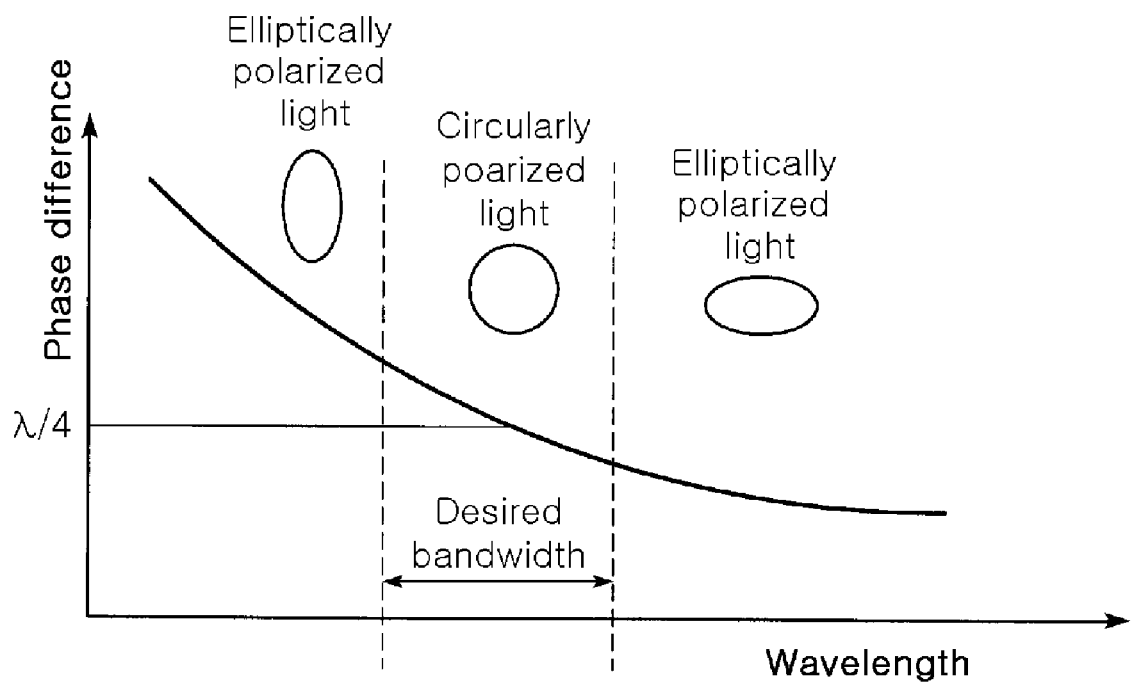
[Fig. 3]

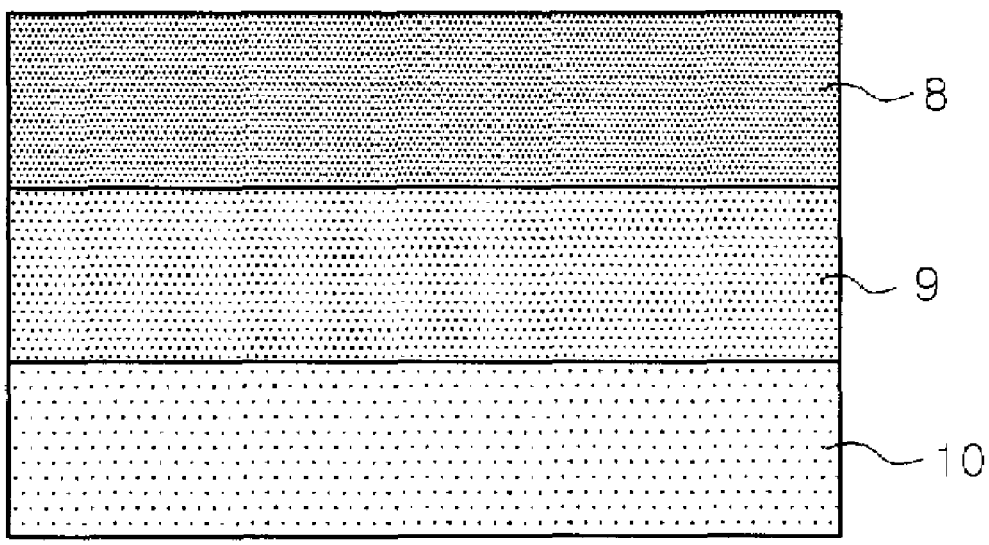
[Fig. 4]

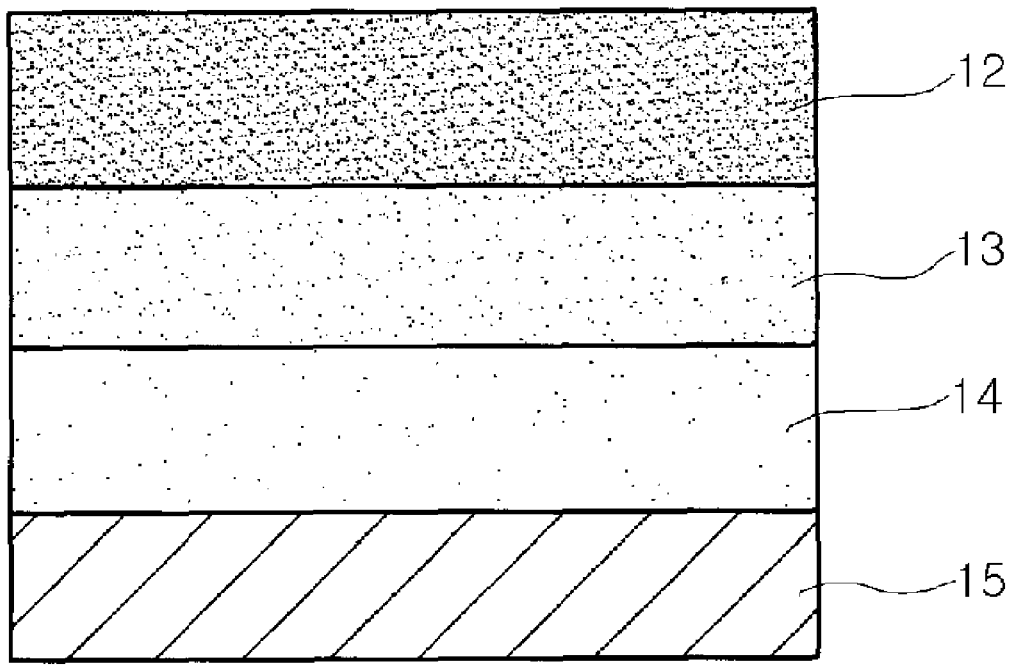
[Fig. 5]

[Fig. 6]
(a)
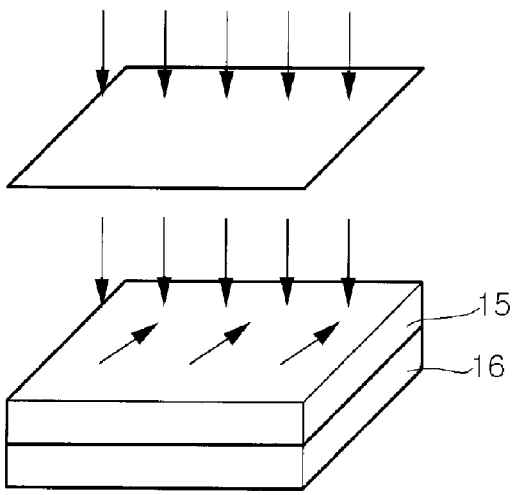
(b)
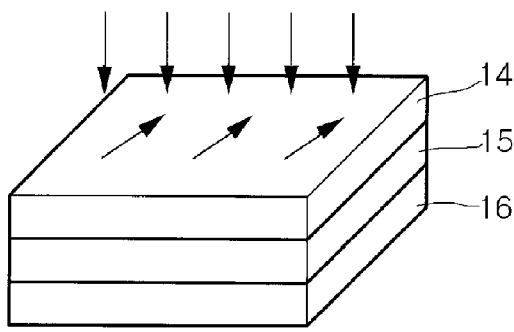
(c)
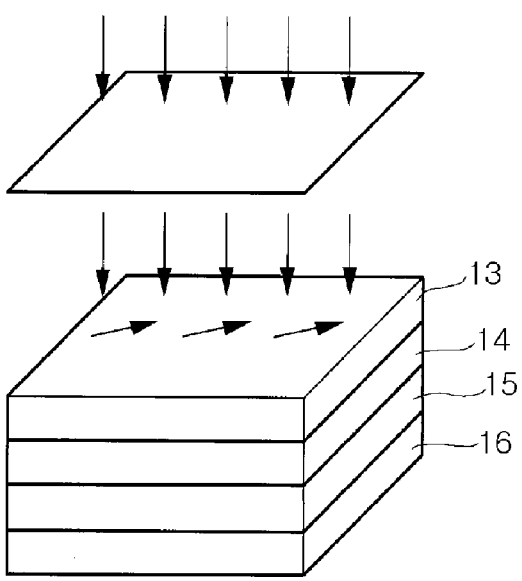
(d)
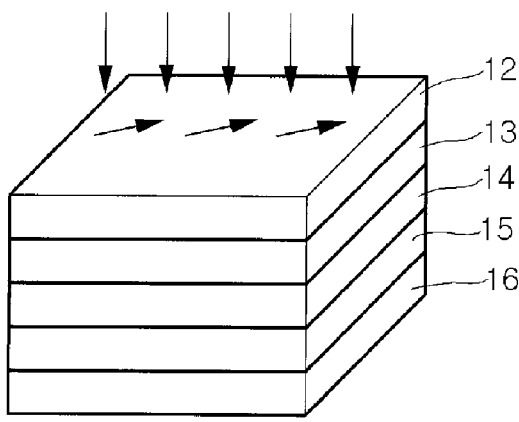

[Fig. 7]
(a)
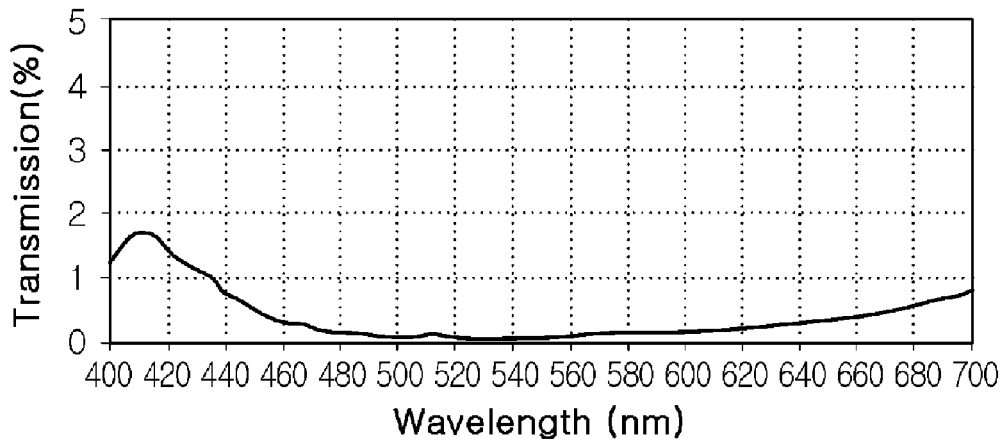
(b)
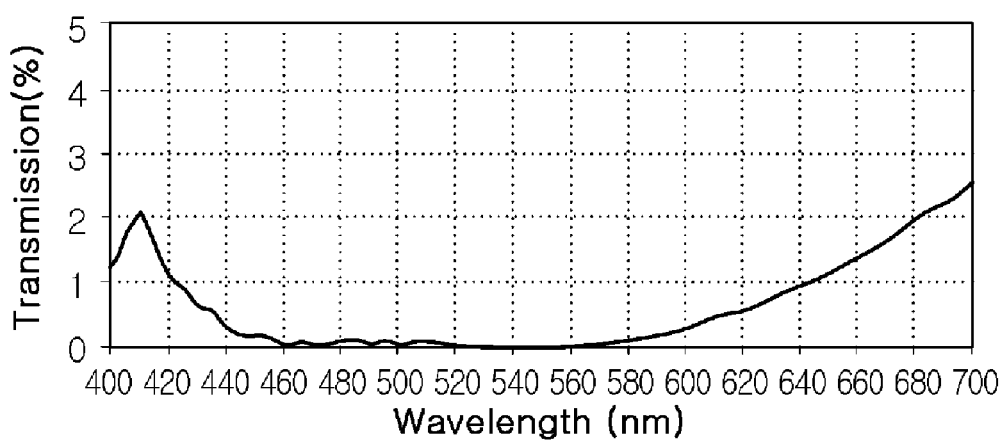
(c)
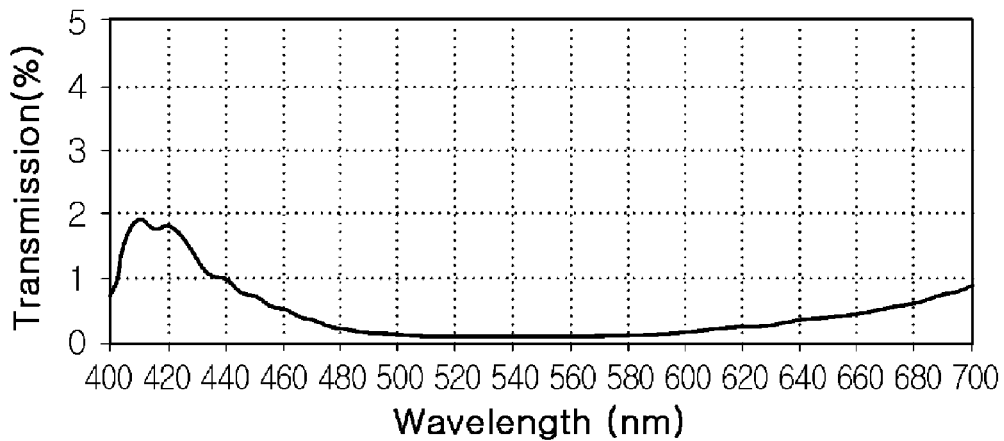

VERY THIN ACHROMATIC QUARTER WAVE FILM LAMINATE FOR TRANSFLECTIVE LCD AND METHOD FOR PRODUCING THE SAME

This application claims priority from Korean Patent Application No. 10-2006-0018746 filed Feb. 27, 2006, which is hereby incorporated by reference as if fully set forth herein.

TECHNICAL FIELD

The present invention relates to an very thin achromatic quarter wave film for transflective LCD. More specifically, the present invention relates to a quarter wave film included in an LCD polarizer. Furthermore, the present invention relates to an very thin achromatic quarter wave film for transflective LCD having a considerably reduced thickness, as compared to conventional quarter wave films in which anisotropic polymeric films are laminated.

BACKGROUND ART

In transflective liquid crystal displays (LCDs), quarter wave film (kind of phase difference film)s impart a phase difference of ¼ wavelength to linearly polarized light passing through a polarization film, thereby converting the linearly polarized light into circularly polarized light.

FIG. 1 is a cross-sectional view schematically illustrating the structure of a laminate constituting a transflective LCD. In FIG. 1, one section associated with indispensable elements of the present invention is enlarged for a better understanding of the present invention. In actual LCDs, an additional layer may be arranged, if necessary.

LCDs transmit information by blocking or transmitting light emitted from a backlight 7 based on polarization until the light is visible to the naked eye through a variety of paths. Generally, light emitted from backlight 7 is visible to the naked eye through a variety of paths, as shown in FIG. 1. Accordingly, the light emitted from backlight 7 can be partially seen to the naked eye.

Based on this point, there have been developed transflective LCDs. More specifically, while utilizing light commonly used in backlights, transflective LCDs reflect light in a region where a separate light source is provided, thereby exhibiting an improved brightness.

The transflective LCDs include the quarter wave films 2 and 5. The reason will be described with reference to FIGS. 1 and 2. In FIG. 2, a portion represented by "x" means that light is emitted to the inside of the LCD, and a portion represented by "•" means that light is emitted to the outside of the LCD.

First, a detailed description will be made with regard to a transflective LCD where an electric field is applied to a liquid crystal layer 3. Light supplied from an external light source, rather than a backlight, is linearly polarized while passing through an uppermost external polarization film 1 of the LCD (SN1). After passing through the quarter wave film 2, the linearly polarized light undergoes the phase difference of a ¼ wavelength, thus being converted into circularly polarized light (SN2). The circularly polarized light transmits the liquid crystal layer 3, to which an electric field is applied. As a result, the liquid crystal loses its original orientation, thus the orientation is changed. That is, the liquid crystal has no specific orientation causing phase difference, thus undergoing no a change in polarization state (SN3). The circularly polarized light is reflected by a reflection plate 4 (SN4). The reflected circularly polarized light passes through the liquid crystal layer 3 while maintaining the same phase difference. As mentioned above, the liquid crystal layer 3 has no specific orientation to create a phase difference, thus undergoing no a change in polarization state (SN5). The circularly polarized light retransmits the quarter wave film 2. At this time, the phase difference of a ¼ wavelength occurs. By adding this phase difference to the phase difference of a ¼ wavelength occurred in SN2, there occurs a total phase difference of a ½ wavelength. The light is finally converted into linearly polarized light equivalent to a 90 degrees rotation from the polarization direction of the linearly polarized light firstly transmitted to the polarization film 1 (SN6). As a result, the polarization direction of light which reaches the uppermost external polarization film 1 is perpendicular to that of the polarization film 1. The light fails to transmit the polarization film 1, thus being blocked by the polarization film 1. Accordingly, in a transflective LCD, where an electric field is applied to a liquid crystal layer 3, light supplied from the external source undergoes no reflection.

On the other hand, in a case where a liquid crystal layer 3 maintains its original orientation without any application of an electric field, the opposite result will be obtained as follows. Light supplied from an external light source is linearly polarized after passing through the polarization film 1 of the LCD (SY1). After passing through the quarter wave film 2, the linearly polarized light is converted into circularly polarized light (SY2). SN1 and SN2 are the same as described above. However, in transmission of the circularly polarized light into the liquid crystal layer 3, there be obtained results different as described above. More specifically, the crystal liquid layer 3 is free from an electric field, thus maintaining its original orientation due to the interaction with the orientation film. Accordingly, the phase difference of a ¼ wavelength can be obtained by controlling the thickness of the crystal liquid layer 3. For this reason, the circularly polarized light in SY2 undergoes a ¼ wavelength the phase difference, thus being perpendicularly polarized to the linearly polarized light in SY1 (SY3). The linearly polarized light is reflected by a reflection plate 4 (SY4). The reflected linearly polarized light passes through the liquid crystal layer 3 while maintaining the same phase difference without any variation in polarization state.

Similarly, the liquid crystal layer 3 maintains its original orientation, thus undergoing the phase difference of a ¼ wavelength. As a result, the linearly polarized light is converted into linearly polarized light undergoing a total phase difference of a ¾ wavelength (SY5). Then, the linearly polarized light retransmits the quarter wave film 2. At this time, the phase difference of a ¼ wavelength occurs. By adding this phase difference to the phase difference of a ¾ wavelength in the previous step, there occurs a total phase difference of a 1 wavelength (i.e., a phase difference of zero). As a result, the polarization direction of light which reaches the uppermost external polarization film is the same as that of the polarization film, thus transmitting the polarization film and being visible to the naked eye. Accordingly, the transflective LCD, where no electric field is applied to a liquid crystal layer 3, has an advantage of improvement in brightness owing to the external source.

As apparent the foregoing, the quarter wave film is an essential element of the transflective LCD.

As shown in FIG. 1, in addition to the quarter wave film 2 arranged on the liquid crystal layer 3, another quarter wave film needs to be arranged at an opposite side of the film 2. It is because additional ¼ wavelength phase difference is needed to allow light emitted from the backlight and transmitting a glass substrate 7 and a lower polarization film 6 to transmit a upper phase polarization film 1 with undergoing no phase difference (i.e., 1 wavelength phase difference) in case that an electric field is applied to a liquid crystal layer. That is to say, a liquid crystal layer in a region, where there is no reflection plate, has a relatively large thickness, as compared to the case of a region where there is a reflective plate. By controlling the thickness of the crystal liquid layer, the phase difference of a ½ wavelength can be obtained upon formation of an electric field. The addition of this phase difference to the phase difference of a ¼ wavelength caused by the phase difference film 2 makes a total phase difference of a ¾ wavelength. The resulting light is converted into circularly polarized light having the phase difference of a ¾ wavelength. To convert the circularly polarized light into linearly polarized light equivalent to the phase difference of a 1 wavelength, there is a need for another quarter wave film 5 to induce an additional occurrence of a quarter wave.

As noted above, the transflective LCD requires in total two quarter wave films.

As shown in FIG. 3, no phase difference film creates the phase difference of a ¼ wavelength in response to light of all wavelengths. That is, the level of the phase difference is varied depending upon the wavelength of light. As can be seen from the curve of FIG. 3, generally, the longer wavelength, the smaller phase difference level. For this reason, in a wavelength range exception for a predetermined wavelength bandwidth, elliptically polarized light, rather than circularly polarized light is generated.

The elliptically polarized light makes it more difficult to control light transmittance based on polarization. To impart the phase difference of a ¼ wavelength to light of a wide wavelength bandwidth, the film essentially needs to be provided with achromaticity.

Generally, the occurrence of the phase difference of a ¼ wavelength for light of a wide wavelength bandwidth is obtained by laminating a ½ wavelength phase difference film and ¼ wavelength phase difference film such that the ½ wavelength phase difference film crosses the ¼ wavelength phase difference film at a specific angle.

Accordingly, the quarter wave film represented by reference numerals "2 or 5" in FIG. 1 is not a single layer. As shown in FIG. 4, the quarter wave film has typically a structure of triple-layer laminate consisting of the quarter wave film has typically a structure of triple-layer laminate consisting of a ¼ wavelength phase difference film 8 or 10 and a ½ wavelength film 10 or 8 which is laminated together and an adhesive layer 9 arranged between the two film to impart binding force therebetween.

For the ¼ and ½ wavelength phase difference films, there is generally used a film made of a polymer capable of exhibiting anisotropy via stretching in a specific direction, e.g., a cycloolefin polymer (COP) or polycarbonate (PC) polymer. The quarter wave film has the structure of a quarter wave film laminate 3 obtained by forming films having a predetermined thickness and laminating the films via the adhesive layer.

Since ¼ and ½ wavelength phase difference films are subjected to stretching to obtain anisotropy, they must be subjected to filmization prior to lamination. During the filmization, the phase difference films must have a sufficient thickness due to the filmization process. The minimal thickness of each film is about 40 μm. A total thickness the laminate consisting of the two films and the adhesive layer reaches about 100 μm.

Recent trends toward slimness of small-medium size display devices (e.g., cellular phones, PDAs and games) have been continued. The phase difference film laminate having a large thickness (about 100 μm) has been a great obstacle to the slimness of the display device.

DISCLOSURE OF INVENTION

Technical Problem

In attempts to solve the problems of the prior art, it is one object of the present invention to provide a very thin quarter wave film laminate having a total thickness of 10 μm or less suitable for use in a transflective LCD.

It is another object of the present invention to provide a method for producing the very thin quarter wave film laminate.

Technical Solution

In accordance with one aspect of the present invention, there is provided a very thin achromatic quarter wave film laminate for transflective LCD comprising: a lower optical-orientation film; a lower phase difference film coated on the lower optical-orientation film; a upper optical-orientation film coated on the lower phase difference film; and a upper phase difference film coated on the upper optical-orientation film, wherein the lower phase difference film and the upper phase difference film are made of liquid crystal.

Preferably, the lower and the upper optical-orientation films may be formed by dissolving a multicyclic compound having a photo-reactive group-containing main chain, and a cross-linking agent in a solvent, and subjecting the solution to coating, drying and UV curing.

The UV curing of the lower and the upper optical-orientation films may be preferably carried out with polarized UV.

The lower phase difference film and the upper phase difference film may be preferably made of photo-polymerized acrylate liquid crystal.

The one selected from the lower phase difference film and the upper phase difference film may be a ¼ wavelength phase difference film, and the other may be a ½ wavelength phase difference film.

In the case that one of the lower and the upper phase difference films is a ¼ wavelength phase difference film, the quarter wave film may be a thickness of 1 to 1.5 μm.

In the case that one of the lower and the upper phase difference films is a ½ wavelength phase difference film, the ½ wavelength phase difference film may be a thickness of 1.6 to 2.3 μm.

Preferably, the ¼ wavelength phase difference film and the ½ wavelength phase difference film may be arranged such that the ¼ wavelength phase difference film crosses the ½ wavelength phase difference film at an angle of 60 to 90 degrees.

In accordance with another aspect of the present invention, there is provided a method for manufacturing an very thin achromatic quarter wave film laminate for transflective LCD: preparing a substrate; coating a solution for an orientation film on the substrate, followed by drying and polarized UV radiation, to form a lower optical-orientation film; coating a liquid crystal solution on the lower optical-orientation film; subjecting the coating to drying and UV curing to form a lower liquid crystal layer; coating the solution for an orientation film on the lower liquid crystal layer, followed by drying and polarized UV radiation, to form a upper optical-orientation film; coating a liquid crystal solution on the upper optical-orientation film; and subjecting the coating to drying and UV curing to form a upper liquid crystal layer.

Preferably, the solution for an orientation film may be prepared by dissolving a multicyclic compound having a photo-reactive group-containing main chain, and a cross-linking agent in a solvent.

Preferably, the liquid crystal solution used in the coating of the lower and the upper liquid crystal layers may contain photo-polymerizable acrylate.

Preferably, the one selected from the lower liquid crystal layer and the upper liquid crystal layer may be formed of a ¼ wavelength phase difference film, and the other may be formed of a ½ wavelength phase difference film.

Preferably, the liquid crystal solution may be coated such that the ¼ wavelength phase difference film has a thickness of 1 to 1.5 µm.

Preferably, the liquid crystal solution may be coated such that the ¼ wavelength phase difference film has a thickness of 1 to 1.5 µm.

To impart achromaticity and quarter wave film performance to the phase difference film laminate, the lower optical-orientation film and the upper optical-orientation film may be preferably formed such that the lower optical-orientation film crosses the upper optical-orientation film at an angle of 60 to 90 degrees.

Preferably, the method may further comprise: subjecting the coating to UV curing, after the drying the coating used in formation for an orientation film, if necessary.

The coating of the liquid crystal solution may be preferably carried out by solution casting.

Similarly, the coating of the orientation film may be preferably carried out by solution casting.

Advantageous Effects

According to the present invention, there can be achieved an very thin achromatic quarter wave film laminate having 3% of the thickness of the conventional laminates. The very thin achromatic quarter wave film laminate exhibits superior achromaticity despite of its small thickness.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a cross-sectional view schematically illustrating the structure of a laminate constituting a transflective LCD;

FIG. 2 is a flow chart illustrating polarization while external light is reflected to a transflective LCD;

FIG. 3 is a graph illustrating distribution characteristics (phenomenon) of a phase difference film whose phase difference is varied depending upon the wavelength of light;

FIG. 4 is a cross-sectional view illustrating the structure of a conventional achromatic ¼ wavelength phase difference film laminate;

FIG. 5 is a cross-sectional view illustrating the structure of a achromatic ¼ wavelength phase difference film laminate according to the present invention;

FIG. 6 is a flow chart illustrating a method for manufacturing a achromatic ¼ wavelength phase difference film laminate according to one embodiment of the present invention; and FIG. 7 is graphs illustrating a comparison in achromaticity between conventional ¼ wavelength phase difference film laminates and the ¼ wavelength phase difference film laminate according to the present invention, respectively:

FIG. 7a is a graph illustrating a measurement result of a reflection ratio of a quarter wave film laminate, where two COP films are joined via an adhesive, at each wavelength;

FIG. 7b is a graph illustrating a measurement result of a reflection ratio of a monolayer-phase difference film (obtained from Teijin) at each wavelength; and FIG. 7c is a graph illustrating a measurement result of a reflection ratio of the quarter wave film laminate in Example 1 of the present invention.

BEST MODE FOR CARRYING OUT THE INVENTION

The present invention will now be described in greater detail.

The present inventors examined thoroughly problems associated with a conventional method for manufacturing a quarter wave film laminate, in which anisotropic polymeric films are laminated via an adhesive. As a result, the present inventors concluded that a reduction in the thickness of a quarter wave film laminate is infeasible, in a case where each anisotropic polymeric film is used for a phase difference film. After repeated searches for a novel desired laminate, the present invention has been finally completed.

In conventional methods, polymeric films are formed, and the polymeric films are then subjected to stretching, thereby imparting anisotropy to the polymeric films. Subsequently, the two films are laminated and joined via an adhesive such that they cross each other at a specific angle. On the contrary, according to the present invention, there is provide an achromatic quarter wave film layer, where very thin ½ and ¼ wavelength phase difference films are laminated by coating.

Each wavelength phase difference film is made of a liquid crystal, rather than materials, e.g., cycloolefin (COP) and polycarbonate (PC) polymers, which are used in conventional methods. In a case that a liquid crystal is mixed with an organic solvent, the mixture can be uniformly dispersed on the surface of the film to be coated owing to its proper viscosity, thus enabling formation of an very thin coating layer having an extremely small thickness. Accordingly, the use of the liquid crystal for a phase difference film ensures the formation of a thin film layer having a thickness of several micrometers (µm) or less.

Preferably, the liquid crystal is made of a polymeric material. The polymeric liquid crystal material has the advantages in that it causes no the following two problems. The first problem is that it is oriented in a predetermined orientation during drying after coated in a state of isotropic material and the problem of returning to isotropic state can be prevented since it is cured by the polymerization reaction during UV radiation.

In particular, a photopolymerizable acrylate monomer or a mixture thereof is preferably used as the polymeric liquid crystal material. Furthermore, preferred is a use of the liquid crystal having a planar orientation in one axis.

As the liquid crystal monomer satisfying the requirements of the preferable acrylate-based liquid crystal, there may be preferably used a low-molecular weight liquid crystal having a nematic phase at a room or high temperature. Suitable examples of the nematic phase liquid crystal monomer include cyanobiphenyl-based acrylate, cyanophenyl cyclohexane-based acrylate, cyanophenyl ester-based acrylate, phenyl ester benzoate-based acrylate, phenylpyrimidine acrylate and a mixture thereof.

In addition, the liquid crystal may comprise a desired amount of a photo-polymerization initiator.

As mentioned above, the quarter wave film of the present invention is a laminate consisting of a ¼ wavelength phase difference film and a ½ wavelength phase difference film. In conventional methods, in a case that an anisotropic polymeric film made of a material such as a cycloolefin polymer (COP) or polycarbonate (PC) is used in the lamination of the ¼ and ½ wavelength phase difference films, a large-thickness adhesive layer is required to secure a binding force between the two films. On the contrary, according to the present invention where a very thinly coated liquid crystal layer is utilized in each phase difference film, the very thinly coated orientation film, rather than the thick adhesive layer, is formed on phase difference film.

The orientation film may be laminated by coating on the lower liquid crystal phase difference film oriented in a specific direction. Accordingly, the orientation film can be adjusted to a very small thickness of about 250 to about 350 nm (about 0.25 to 0.35 μm). In the following process, another phase difference film may be directly formed by coating on the orientation film, thus eliminating the necessity of the thick adhesive layer. The lower phase difference film is formed on the substrate. To impart orientation to the lower phase difference film, another orientation film is preferably formed on the substrate.

Preferably, the orientation film is made of an optical-orientating material. The phase difference film laminate is used with being attached to a polarizer in general. To utilize rubbing-type orientation film, an orientation film is rubbing-treated prior to attaching the phase difference film to a polarization sheet, thus disadvantageously causing complicated process and making it difficult to utilize an efficient production method, such as roll-to-roll. On the other hand, in a case where the orientation film is made of an optical-orientating material according to the present invention, the optical-orientating material is subjected to a series of coating, drying and, polarized UV radiation to form an optical-orientation film, thereby enabling simplification of manufacture process and application of roll-to-roll.

In addition, an orientation film for the rubbing orientation has a limitation in a rubbing direction (i.e., maximum±45°), thus disadvantageously involving re-cutting of a polarizer in accordance with a specific orientation direction upon manufacturing the polarizer. However, the optical-orientation film enables a desired orientation direction to be readily varied depending upon the polarized UV radiation direction, thus involving only cutting a polarization sheet perpendicularly to the length direction of the polarization sheet after manufacturing the polarization sheet. Accordingly, the disadvantage associated with the cutting in accordance with the desired orientation direction can be avoided.

The main feature of the present invention for securing the advantage is to form an optical-orientation film by imparting orientation to an optical-orientating material via a series of coating, drying, and polarized UV radiation.

The orientation film made of an optical-orientating material is arranged between two phase difference films (½ and ¼ wavelength phase difference films). In addition, the orientation film may be preferably used as an orientation film of the lower phase difference film. As mentioned above, the optical orientation allows the liquid crystal to be orientated in all directions at any angle compared with rubbing, thus readily obtaining an achromatic quarter wave film laminate structure where optical axises of phase difference films cross each other. As a result, sequential coating can be simultaneously carried out. In addition, significant advantages in view of production time and efficiency can be obtained. Furthermore, a non-contact method is used, thereby avoiding the disadvantages of a contact-type method (e.g., contamination from foreign materials and electrostatic occurrence), and obtaining a high-quality phase difference film.

The optical-orientating material is preferable produced by dissolving a multicyclic compound having a photo-reactive group-containing main chain in a solvent. Suitable examples of the multicyclic compound include a norbornene polymer. Suitable examples of the solvent include cyclopentanone.

In the phase difference film of the present invention, there may used a polymer derived from a polymerization repeated unit (i.e., monomer) represented by the following Formula I as an optical-orienting material, which is a multicyclic compound having a photo-reactive group used in the formation of the orientation film (polymeric film).

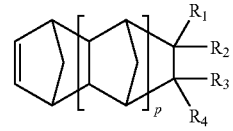

(1)

wherein P is an integer of 0 to 4;

at least one of $R_1$, $R_2$, $R_3$ and $R_4$ is selected form the group consisting of the following structural formulas a, b, c, and d; and the others are independently selected from the group consisting of: hydrogen; halogen; substituted or unsubstituted $C_1$-$C_{20}$ alkyl; substituted or unsubstituted $C_2$-$C_{20}$ alkenyl; substituted or unsubstituted, saturated or unsaturated $C_5$-$C_{12}$ cycloalkyl; saturated or unsaturated $C_6$-$C_{40}$ aryl, substituted or unsubstituted $C_7$-$C_{15}$ aralkyl; substituted or unsubstituted $C_2$-$C_{20}$ alkynyl; and polar non-hydrocarbonic group containing at least one selected from the group consisting of oxygen, nitrogen, phosphorus, sulfur, silicon and boron;

$R_1$ and $R_2$, or $R_3$ and $R_4$ are each joined together to form $C_1$-$C_{10}$ alkylidene, or $R_1$ or $R_2$ is joined with one of $R_3$ and $R_4$ to form substituted or unsubstituted $C_4$-$C_{12}$ cycloalkyl, or a $C_6$-$C_{24}$ aromatic cyclic compound,

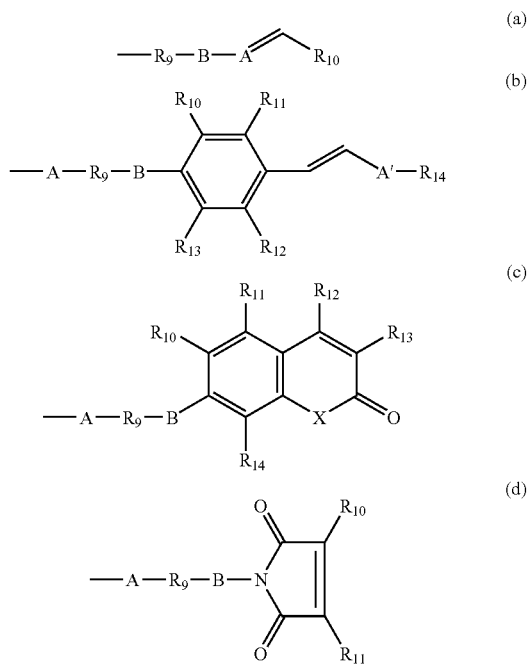

wherein in Formulas a, b, c and d,

A and A' are independently selected from the group consisting of substituted or un-substituted $C_1$-$C_{20}$ alkylene, carbonyl, carboxyl, and substituted or unsubstituted $C_6$-$C_{40}$ arylene;

B is oxygen, sulfur or —NH—;

X is oxygen or sulfur;

$R_9$ is selected from the group consisting of a single bond, substituted or un-substituted $C_1$-$C_{20}$ alkylene; substituted or unsubstituted $C_2$-$C_{20}$ alkenylene; substituted or unsubstituted, saturated or unsaturated $C_5$-$C_{12}$ cycloalkylene; substituted or un-substituted $C_6$-$C_{40}$ arylene; substituted or unsubstituted $C_7$-$C_{15}$ aralkylene; and substituted or unsubstituted $C_2$-$C_{20}$ alkynyl; and $R_{10}$, $R_{11}$, $R_{12}$, $R_{13}$ and $R_{14}$ are independently selected from the group consisting of substituted or unsubstituted $C_1$-$C_{20}$ alkyl substituted or unsubstituted $C_1$-$C_{20}$ alkoxy, substituted or unsubstituted $C_6$-$C_{30}$ aryloxy, and substituted or unsubstituted $C_6$-$C_{40}$ aryl.

The polymer derived from the monomer of the following Formula I has preferably a degree of polymerization of 50 to 5,000. In case that a polymerization degree is lower than 50, realization of good orientation is impossible. On the other hand, when a polymerization degree is higher than 5,000, the viscosity of the monomer based on the molecular weight thereof increases, thus making it difficult to coat the orientation film to the desired thickness.

Based on the foregoing, the structure of the quarter wave film laminate of the present invention will be described in detail. As shown in FIG. 5, the quarter wave film laminate has a quadruple-layer structure consisting of a lower orientation film 15, a ¼ wavelength phase difference film 12 or 14, an upper orientation film 13, and a ½ wavelength phase difference film 14 or 12. The top and bottom arrangement of the ½ and ¼ wavelength films is particularly not limited. That is to say, the upper phase difference film 12 may be either the ½ wavelength phase difference film or the ¼ wavelength phase difference film.

Preferably, to impart achromaticity to the laminate, the ½ wavelength phase difference film preferably crosses the ¼ wavelength phase difference film at an angle of 60 to 90 degrees. The orientation direction of each phase difference film is determined by the angle of the orientation film, as mentioned below. The angle between ½ wavelength and the ¼ wavelength phase difference films can be controlled by making the lower and upper orientation films cross each other at an angle within the range.

The phase difference caused by each phase difference film is determined depending upon the texture and thickness thereof. Therefore, to us a film layer as the phase difference film, the thickness of the film layer must be adjusted to a desired level. In a case where the film layer is made of the photo-polymerizable acrylate-based liquid crystal mixture according to the present invention, the thickness of the ½ wavelength phase difference film is preferably adjusted to 1.6 to 2.3 µm, and the thickness of the ¼ wavelength phase difference film is preferably adjusted to 1 to 1.5 µm. The film thickness is slightly varied by the type of acrylate used.

The lower phase different film is formed on the polymeric substrate capable of inducing a liquid crystal orientation regardless of the type thereof (i.e., regardless of the ½ and the ¼ wavelength phase difference film). Any polymer may be used for the polymeric substrate without particular limitation so long as is optically transparent and thick and it can allow stable coating of solution. Suitable examples of the polymer include polymethyl methacrylate, acrylate/methacrylate copolymer, polyvinyl alcohol, modified-polyvinyl alcohol, poly(N-methylol acrylamide), styrene/vinyl toluene copolymer, chloro sulfonated polyethylene, nitrocellulose, chlorinated polyolefin, polyester, polyimide, vinyl acetate/vinyl chloride copolymer, ethylene/vinyl acetate copolymer, cellulose acetate, polyethylene, polypropylene, and polycarbonate. Preferred are polymethyl methacrylate, polyvinyl alcohol, modified-polyvinyl alcohol, polyester, cellulose acetate, and polycarbonate.

The quarter wave film laminate of the present invention can be readily separated from the polymeric substrate. Therefore, the laminate, from which the polymeric substrate is removed, may be utilized in a final use.

The phase difference films constituting the quarter wave film laminate of the present invention may be made of same or different material with respect to each other under the conditions that they completely satisfy the requirements.

According to the present invention, an achromatic quarter wave film is manufactured in accordance with the following method.

First, an optical-orientation film 15 is formed on a substrate for use in formation of a phase difference film. There may be used a common substrate, e.g., polyester, cellulose, and polyvinyl alcohol films. Any substrate may be used without particular limitation so long as it is commonly used in the art. As mentioned above, it is preferable to form the orientation film on the surface of a polarization sheet. This is the reason that a roll-to-roll method is applicable to form the film laminate of the present invention, thus enabling simplification of manufacture process. The optical-orientation film may be formed by coating a polymeric solution, in which the desired optical-orientating material is dissolved, on a substrate, followed by drying and radiating with UV polarized in the desired direction, thereby enabling the orientation film to be orientated and cured at the same time.

The polymeric solution is produced by dissolving the desired optical-orientating material in the desired kind of a solvent. To secure the desired coatability, the orientation film material may be preferably used in an amount of 1 to 10% by weight, based on the weight of the solution. The solution obtained by the procedure can be uniformly and thinly coated on the surface of the substrate by solution casting.

Subsequently, the coated solution is subjected to drying. The drying is preferably carried out at 80 to 100° C.

Then, the dried solution is subjected to polarized UV curing to form an optical-orientation film 15.

The optical-orientation film is coated with a liquid crystal solution for formation of a lower phase difference film 14. At this time, the liquid crystal solution may be prepared by dissolving the liquid crystal material in a toluene-based solvent. The liquid crystal solution comprises 20 to 40% by weight of the liquid crystal material and 60 to 80% by weight of the solvent. The coating of the liquid crystal solution is preferably carried out by solution casting to realize formation of uniform and thin coating.

The coated liquid crystal solution is subjected to drying and UV curing to form a phase difference film layer 14 oriented in a specific direction (lower phase difference film layer).

The drying is preferably carried out in a dry oven at a temperature of 25 to 70° C. for 1 to 5 min. The drying temperature considerably affects orientation, arrangement and position of the liquid crystal. When the drying is carried out at a temperature out of the desired range, an undesired orientation may be occurred. An insufficient drying may result in defects, e.g., spots. Accordingly, the drying is preferably carried out for 1 min or more. The drying for about 5 min is sufficient. Therefore, the drying time is defined as 1 to 5 min.

The UV curing is carried out in accordance with a conventional liquid crystal curing method.

Then, a polymeric solution is coated on the liquid crystal layer, followed by drying, for formation of an orientation film 13. The formation method of the optical-orientation film 13 is the same as that of the optical-orientation film 15.

To form another phase difference film 12 (upper phase difference film layer) on the orientation film 13, a liquid crystal solution is subjected to a series of coating, drying and UV curing.

A series of processes, i.e., coating, drying and UV curing used in the formation of the lower phase difference film 14 are also applied to the formation of the upper phase difference film 12.

Thereafter, the lowermost polymeric substrate used in the formation of the lower phase difference film 14 may be removed, if necessary.

Mode for the Invention

The present invention will be better understood from the following examples. These examples are not to be construed as limiting the scope of the invention.

EXAMPLES

Example 1

Formation of Achromatic Quarter Wave Film Laminate

A method for manufacturing an achromatic quarter wave film laminate will be described with reference to FIG. 6 and Table 1.

TABLE 1

| Composition | Phase difference film (¼ and ½ wavelength) | Optical-orientation film |
|---|---|---|
| Solid | Cyanobiphenyl acrylate 20 wt % | Norbornene polymer 2 wt % |
| solvent | Toluene 80 wt % | Cyclopentanone 98 wt % |

To manufacture an achromatic quarter wave film laminate of the present invention, an optical-orientating material was coated on a polymeric substrate by solution casting. The coated material was dried at 80° C. for 5 min. The resulting layer is subjected to optical-orientation by polarized UV radiation (FIG. 6a). The polarized UV radiation is carried out with a UV polarization device. To allow the polarization direction of a UV polarization plate to be readily controlled, a jig was equipped with the UV polarization device. Accordingly, the orientation direction of the optical-orientation film can be controlled by freely varying the polarization direction via the jig upon UV curing. In this example, the angle between the orientation direction of the lower optical-orientation film coated on the substrate and the absorption axis of the polarizer was adjusted to 70 degrees (an error range=±3 degrees).

Then, solution of liquid crystal having a composition of table 1 was coated on the optical-orientation film which was formed on the substrate. The isotropic liquid crystal layer thus coated is dried in a dry oven at 50° C. for 1 min to allow the ¼ wavelength phase difference film layer oriented in a specific direction to be fixed. The resulting ¼ wavelength phase difference film layer is cured by curing the fixed film layer with UV (FIG. 6b).

A upper optical-orientation film was formed on the ¼ wavelength phase difference film layer to have a thickness of 200±50 nm in the same manner as in the previous step. The material and production method used in the formation of the upper optical-orientation film was the same as that of the lower optical-orientation film.

The angle between the orientation direction of the upper orientation film and the absorption axis of the polarizer was adjusted to 15 degrees (an error range=±3 degrees) to adjust the angle between the ½ and ¼ wavelength phase difference film layers to 15 degrees (FIG. 6c).

A ½ wavelength phase difference film is coated on the upper orientation film in the same manner as in the coating of ¼ wavelength phase difference film except that the thickness of the film was adjusted to 1.6±0.2 μm to impart a ½ wavelength phase difference to the film (FIG. 6d).

In accordance with the procedure, there was obtained a quarter wave film laminate consisting of the lower orientation film, the ¼ wavelength phase difference film, the upper orientation film, and the ½ wavelength phase difference film laminated in this order. The thickness of the laminate exception for the thickness of the lowermost polymeric substrate was about 3 μm. As could be seen from the foregoing, the very thin achromatic quarter wave film laminate had 3% of the thickness of the conventional laminate having a thickness of 100 μm in which anisotropic polymeric films are joined together via an adhesive.

Example 2

Evaluation for Achromaticity of Quarter Wave Film Laminate

The wavelength bandwidth, in which the quarter wave film laminate thus manufactured in Example 1 exhibits achromaticity, was analyzed with a double refraction measuring system. The achromaticity depends on the double refraction measurement. There was made a comparison in achromaticity between a phase difference film made of a COP (cycloolefin polymer) film used for a conventional quarter wave film laminate, and an achromatic monolayer-phase difference film (obtained from Teijin).

The results were shown in FIG. 7. FIG. 7a is a graph illustrating a measurement result of a reflection ratio of a quarter wave film laminate, where two COP films are joined via an adhesive, at each wavelength. FIG. 7b is a graph illustrating a measurement result of a reflection ratio of a monolayer-phase difference film (obtained from Teijin) at each wavelength. FIG. 7c is a graph illustrating a measurement result of a reflection ratio of the quarter wave film laminate in Example 1 of the present invention.

It could be confirmed that the phase difference film in Example 1 (FIG. 7c) and the phase difference film obtained by laminating two COP films (FIG. 7a) exhibited a broad range in wavelength where there hardly occurs reflection. On the contrary, the monolayer-phase difference film had a small range in wavelength where there is no reflection, and a relatively significantly high reflection ratio at a long wavelength, as shown in FIG. 7b.

As apparent from the foregoing, the quarter wave film laminate according to the present invention has a wavelength range capable of exhibiting achromaticity comparable to conventional laminates, while having a considerably reduced thickness, as compared to the conventional laminates.

INDUSTRIAL APPLICABILITY

As apparent from the foregoing, according to the present invention, there can be achieved an very thin achromatic quarter wave film laminate having 3% of the thickness of the conventional laminates. The very thin achromatic quarter wave film laminate exhibits excellent superior achromaticity despite its small thickness.

The invention claimed is

1. An achromatic quarter wave film laminate for transflective LCD comprising:
   a lower optical-orientation film;
   a lower phase difference film coated on the lower optical-orientation film;
   a upper optical-orientation film coated on the lower phase difference film; and a upper phase difference film coated on the upper optical-orientation film,
   wherein the lower phase difference film and the upper phase difference film are made of liquid crystal, and
   wherein the lower and the upper optical-orientation films are formed by dissolving a multicyclic compound having a photo-reactive group-containing main chain, and a cross-linking agent in a solvent, and subjecting the solution to coating, drying and UV (ultraviolet) curing.

2. The achromatic quarter wave film laminate for transflective LCD according to claim 1, wherein the UV curing of the lower and the upper optical-orientation films is carried out with polarized UV.

3. The achromatic quarter wave film laminate for transflective LCD according to claim 1, wherein the lower phase difference film and the upper phase difference film are made of photo-polymerized acrylate liquid crystal.

4. The achromatic quarter wave film laminate for transflective LCD according to claim 1, wherein one selected from the lower phase difference film and the upper phase difference film is a ¼ wavelength phase difference film and the other is a ½ wavelength phase difference film.

5. The achromatic quarter wave film laminate for transflective LCD according to claim 4, wherein the ¼ wavelength phase difference film is a thickness of 1 to 1.5 µm.

6. The achromatic quarter wave film laminate for transflective LCD according to claim 4, wherein the ½ wavelength phase difference film is a thickness of 1.6 to 2.3 µm.

7. The achromatic quarter wave film laminate for transflective LCD according to claim 4, wherein the ¼ wavelength phase retardation film and the ½ wavelength phase difference film are arranged such that the ¼ wavelength phase difference film crosses the ½ wavelength phase difference film at an angle of 60 to 90 degrees.

8. A method for manufacturing an achromatic quarter wave film laminate for transflective LCD:
   preparing a substrate;
   coating a solution for an orientation film on the substrate, followed by drying and polarized UV radiation, to form a lower optical-orientation film;
   coating a liquid crystal solution on the lower optical-orientation film; subjecting the coating to drying and UV curing to form a lower liquid crystal layer;
   coating the solution for an orientation film on the lower liquid crystal layer, followed by drying and polarized UV radiation, to form a upper optical-orientation film;
   coating a liquid crystal solution on the upper optical-orientation film; and subjecting the coating to drying and UV curing to form a upper liquid crystal layer,
   wherein the solution for an orientation film is prepared by dissolving a multicyclic compound having a photo-reactive group-containing main chain, and a cross-linking agent in a solvent.

9. The method according to claim 8, wherein the liquid crystal solution used in the coating of the lower and the upper liquid crystal layers contains photopolymerizable acrylate.

10. The method according to claim 8, wherein one selected from the lower liquid crystal layer and the upper liquid crystal layer is formed of a ¼ wavelength phase difference film, and the other is formed of a ½ wavelength phase difference film.

11. The method according to claim 10, wherein the liquid crystal solution is coated such that the ¼ wavelength phase difference film has a thickness of 1 to 1.5 µm.

12. The method according to claim 10, wherein the liquid crystal solution is coated such that the ½ wavelength phase difference film has a thickness of 1.6 to 2.3 µm.

13. The method according to claim 8, wherein the lower optical-orientation film and the upper optical-orientation film are formed such that the lower optical-orientation film crosses the upper optical-orientation film at an angle of 60 to 90 degrees.

14. The method according to claim 8, further comprising: subjecting the coating to UV curing, after the drying the coating used in formation for an orientation film.

15. The method according to claim 8, wherein the coating of the liquid crystal solution is carried out by solution casting.

16. The method according to claim 8, wherein the coating of the orientation film is carried out by solution casting.

* * * * *